United States Patent
Nonaka et al.

(10) Patent No.: US 12,402,055 B2
(45) Date of Patent: Aug. 26, 2025

(54) CONTROL APPARATUS, RADIO COMMUNICATION SYSTEM, AND CONTROL METHOD

(71) Applicant: NTT DOCOMO, INC., Tokyo (JP)

(72) Inventors: Nobuhide Nonaka, Tokyo (JP); Tatsuki Okuyama, Tokyo (JP); Satoshi Suyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 464 days.

(21) Appl. No.: 17/906,921

(22) PCT Filed: Mar. 25, 2021

(86) PCT No.: PCT/JP2021/012589
§ 371 (c)(1),
(2) Date: Sep. 21, 2022

(87) PCT Pub. No.: WO2021/193832
PCT Pub. Date: Sep. 30, 2021

(65) Prior Publication Data
US 2023/0116416 A1   Apr. 13, 2023

(30) Foreign Application Priority Data

Mar. 27, 2020   (JP) ................. 2020-058853

(51) Int. Cl.
*H04W 4/00*  (2018.01)
*H04W 36/32* (2009.01)

(52) U.S. Cl.
CPC ............ *H04W 36/324* (2023.05)

(58) Field of Classification Search
CPC ........ H04W 36/324; H04W 36/087; H04W 88/085; H04W 28/16; H04W 92/04
USPC ....................................... 370/331
See application file for complete search history.

(56) References Cited

U.S. PATENT DOCUMENTS

| | | | | |
|---|---|---|---|---|
| 6,879,285 B2 * | 4/2005 | Nobukiyo | ......... | H04M 3/42348 455/414.3 |
| 7,817,014 B2 * | 10/2010 | Krishna | ............ | G06K 17/0029 340/10.5 |
| 9,325,475 B2 * | 4/2016 | Hoshino | ............... | H04L 1/0026 |
| 9,490,548 B2 * | 11/2016 | Weissman | ............ | H01Q 25/002 |
| 9,554,409 B2 * | 1/2017 | Saito | ..................... | H04W 72/02 |
| 9,722,682 B2 * | 8/2017 | Bengtsson | ........... | H04B 7/0689 |

(Continued)

FOREIGN PATENT DOCUMENTS

JP   2015-097329 A   5/2015
JP   2017511033 A   4/2017

(Continued)

OTHER PUBLICATIONS

Office Action issued in Japanese Application No. 2020-058853; Dated Oct. 31, 2023 (7 pages).

(Continued)

*Primary Examiner* — Amancio Gonzalez
(74) *Attorney, Agent, or Firm* — Osha Bergman Watanabe & Burton LLP (57) ABSTRACT

A control apparatus includes a control section that determines, for each terminal, a method for a coordinated operation performed between a plurality of radio apparatuses for signal transmission to the terminal, and a transmission section that outputs control information on the method determined.

2 Claims, 7 Drawing Sheets

(56) References Cited

U.S. PATENT DOCUMENTS

| | | | |
|---|---|---|---|
| 10,165,532 B2* | 12/2018 | Fujishiro | H04W 56/001 |
| 10,237,760 B2* | 3/2019 | Negus | H04W 72/541 |
| 10,243,665 B2* | 3/2019 | Anderson | H04B 10/07955 |
| 10,613,213 B2* | 4/2020 | Silverstein | H04L 12/2803 |
| 10,992,327 B2* | 4/2021 | Hou | H01Q 1/526 |
| 11,452,032 B2* | 9/2022 | Gupta | H04W 4/021 |
| 11,456,790 B2* | 9/2022 | Park | H04B 7/0617 |
| 11,715,889 B2* | 8/2023 | Zhang | H05K 1/0243 343/700 R |
| 2010/0220666 A1 | 9/2010 | Imamura et al. | |
| 2010/0260092 A1* | 10/2010 | Nagaraja | H04B 7/026 370/315 |
| 2014/0376676 A1* | 12/2014 | Schafferer | H04L 7/0091 327/552 |
| 2015/0312871 A1* | 10/2015 | Tong | H04W 36/0085 370/252 |
| 2016/0366704 A1 | 12/2016 | Lee et al. | |
| 2017/0187428 A1* | 6/2017 | Guan | H04L 5/0048 |
| 2018/0351668 A1 | 12/2018 | Kim | |
| 2019/0098639 A1 | 3/2019 | Kubo et al. | |

FOREIGN PATENT DOCUMENTS

| | | |
|---|---|---|
| WO | 2007074841 A1 | 7/2007 |
| WO | 2017/154966 A1 | 9/2017 |
| WO | 2018064367 A1 | 4/2018 |

OTHER PUBLICATIONS

Decision of Refusal issued in counterpart Japanese Application No. 2020-058853, mailed Mar. 12, 2024 (6 pages).

Reconsideration Report for Japanese Patent Application No. 2020-058853, dated Sep. 5, 2024 (5 pages).

Written Opinion for corresponding International Application No. PCT/JP2021/012589, mailed Jun. 22, 2021 (5 pages).

International Search Report for corresponding International Application No. PCT/JP2021/012589, mailed Jun. 22, 2021 (5 pages).

The Telecommunication Technology Committee; "TR-1079 Technical report of optical access technologies applying 5G mobile fronthaul"; v. 1.0; May 30, 2019 (49 pages).

Notice of the Reasons for Rejection in Japanese Patent Application No. 2020-58853, dated Jan. 14, 2025 (8 pages).

\* cited by examiner

CONTROL APPARATUS, RADIO COMMUNICATION SYSTEM, AND CONTROL METHOD

TECHNICAL FIELD

The present disclosure relates to a control apparatus, a radio communication system, and a control method.

BACKGROUND ART

Long Term Evolution (LTE) has been specified for achieving a higher data rate, lower latency, and the like in a Universal Mobile Telecommunication System (UMTS) network. Future systems of LTE have also been studied for achieving a broader bandwidth and a higher speed based on LTE. Examples of the future systems of LTE include systems called LTE-Advanced (LTE-A), Future Radio Access (FRA), 5th generation mobile communication system (5G), 5G plus (5G+), Radio Access Technology (New-RAT), New Radio (NR), and the like.

CITATION LIST

Non-Patent Literature

NPL 1
Telecommunication Technology Committee, "TR-1079 Technical report of optical access technologies applying 5G mobile fronthaul," v1.0, May 30, 2019

SUMMARY OF INVENTION

Technical Problem

For a radio communication system such as NR, a Base Station (BS) cooperation technique for cooperation of transmission operations or reception operations between a plurality of BSs has been under consideration.

One objective of the present disclosure is to achieve an appropriate control of BS cooperation.

Solution to Problem

A control apparatus according to an aspect of the present disclosure includes: a control section that determines, for each terminal, a method for a coordinated operation performed between a plurality of radio apparatuses for signal transmission to the terminal; and a transmission section that outputs control information on the method determined.

Advantageous Effects of Invention

According to the present disclosure, it is possible to achieve an appropriate control of BS cooperation.

DESCRIPTION OF EMBODIMENTS

An embodiment of the present invention will be described below with appropriate reference to the accompanying drawings. The same elements are denoted by the same reference numerals throughout the present specification unless otherwise specified. The following descriptions given in conjunction with the accompanying drawings are for explaining an exemplary embodiment but not for specifying the only embodiment. For example, in the case where the order of operations is described in the embodiment, the order of the operations may be appropriately changed as long as no inconsistency occurs in the operations as a whole.

When a plurality of embodiments and/or modifications are illustrated, some configurations, functions and/or operations in a certain embodiment and/or modification may be included in other embodiments and/or modifications, or may be replaced by corresponding configurations, functions and/or operations of other embodiments and/or modifications as long as no inconsistency occurs.

In addition, in the embodiment, an unnecessarily detailed description may be omitted. For example, detailed descriptions of publicly known or well-known technical matters may be omitted in order to avoid unnecessarily redundant descriptions and/or obscuring technical matters or concepts, so as to facilitate understanding by those skilled in the art. In addition, duplicate descriptions of substantially the same configurations, functions, and/or operations may be omitted.

The accompanying drawings and the following description are provided to assist those skilled in the art to understand the embodiment, but are not intended to limit the claimed subject. In addition, the terms used in the following description may be appropriately replaced with other terms to aid the understanding of those skilled in the art.

<Findings Leading to Present Disclosure>

In order to deal with an increasing amount of mobile communication traffic, a technique for increasing the communication speed and communication capacity is desired.

For example, there is a case where, at the boundary between cell #1 corresponding to a certain Base Station (BS) #1 and cell #2 adjacent to cell #1, the throughput in a User Equipment (UE) connected to base station #1 by radio decrease due to the interference by base station #2 corresponding to cell #2. The boundary between two or more cells may correspond to, for example, an overlapping area between areas corresponding respectively to the cells. The boundary between two or more cells may be referred to as a "cell edge" or "cell boundary."

In order to increase the throughput at the cell edge, a BS cooperation technique in which a plurality of BSs coordinately perform transmission and/or reception has been under consideration.

Further, functional allotment for splitting radio communication functions including base station functions among a plurality of apparatuses (e.g., units) has been studied. For example, it is considered to split the radio communication functions into a radio unit (RU) that transmits and receives a radio signal, a baseband unit (BBU) that is connected to the RU and is responsible for signal processing of the baseband, and a central unit (CU) that is connected to the BBU and controls the BBU and the RU.

The BBU may be referred to as "baseband (BB) control apparatus," "baseband aggregation apparatus," "centralized baseband unit (CBBU)," or "radio equipment controller (REC)," for example. The RU may also be referred to as "radio apparatus," "remote radio head (RRH)," or "radio equipment (RE)," for example. The CU may also be referred to as "upper control apparatus," for example.

The connection between the BBU and the CU is referred to as "backhaul (BH)." For example, a wire cable such as an optical fiber cable is used for the BH. The connection between the BBU and the RU is referred to, for example, as "fronthaul (FH)." For example, a wire cable such as an optical fiber cable is used for the FH.

Note that, in the configuration with the functional allotment described above, a communication apparatus including the BBU and the RU may be referred to as "base station (BS)," or a communication apparatus including the CU, the BBU, and the RU may be referred to as "base station (BS)."

In the configuration with the functional allotment described above, the BS cooperation technique in which a plurality of BSs coordinately perform transmission and/or reception is applied.

Figure 1:
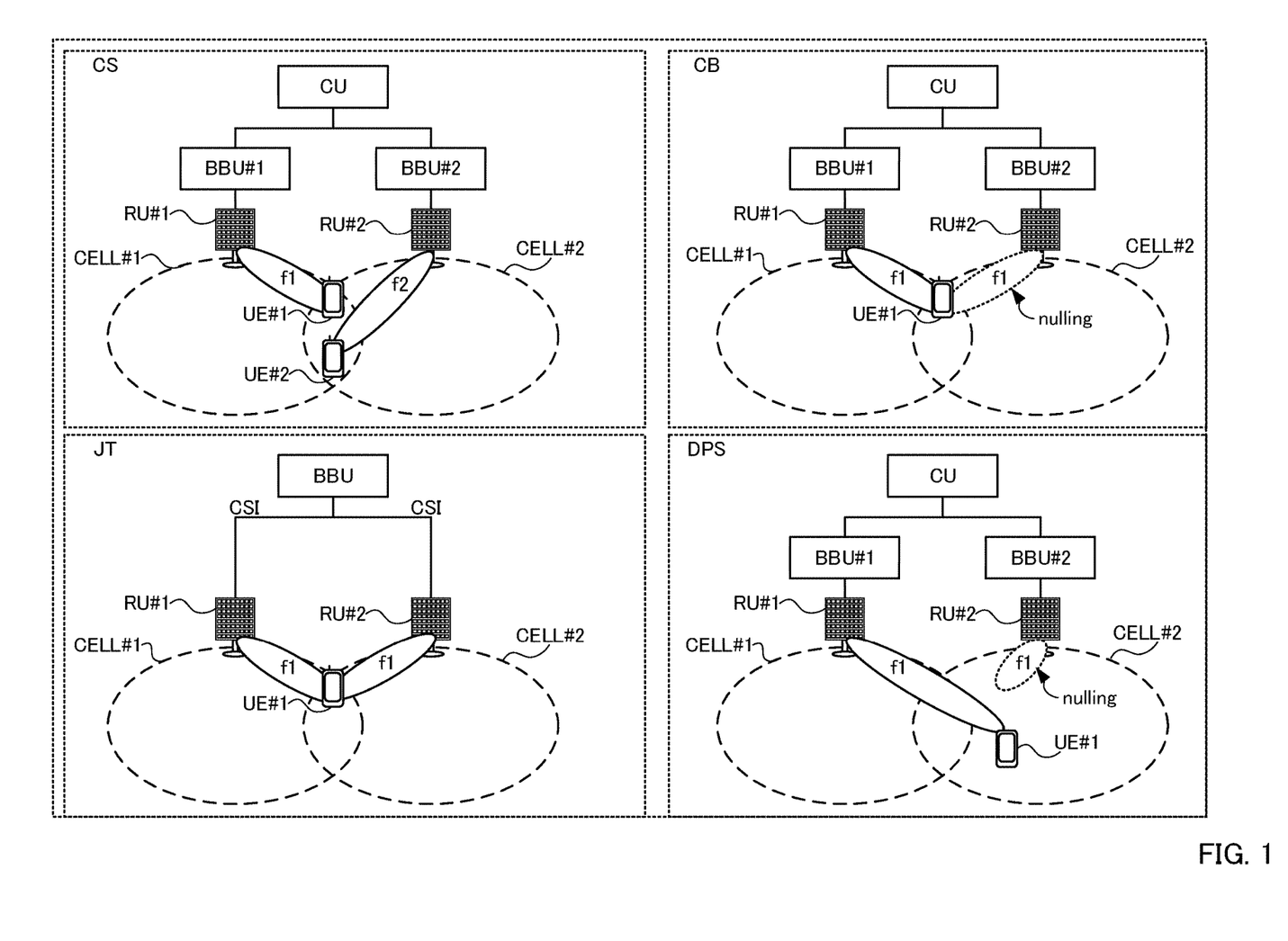
FIG. 1 illustrates examples of a BS cooperation technique.

FIG. 1 illustrates examples of the BS cooperation technique. FIG. 1 illustrates four examples of the BS cooperation technique of coordinated scheduling (CS), coordinated beamforming (CB), joint transmission (JT), and dynamic point selection (DPS). By way of example, FIG. 1 illustrates the BS cooperation techniques performed for a UE located at a boundary between cell #1 corresponding to RU #1 and cell #2 corresponding to RU #2 or a UE located in either cell. Note that, the BS cooperation technique may be referred to as "coordinated operation." The four BS cooperation techniques may also be referred to as four patterns (types) of the coordinated operation.

In the CS, scheduling is performed coordinately between the base stations. Here, the scheduling includes resource allocation. For example, in the CS, two or more UEs located at the cell boundary are allocated resources different between the UEs in scheduling.

For example, in the example of FIG. 1, the CU performs scheduling including resource allocation for the UEs existing in cell #1 or cell #2 in a system configuration in which RU #1 is connected to BBU #1, RU #2 is connected to BBU #2, and BBU #1 and BBU #2 are connected to the CU. In addition, based on the scheduling determined by the CU, RU #1 connected to BBU #1 and RU #2 connected to BBU #2 transmit signals to the UEs.

Note that, in the following description, BBU #y connected to certain CU #x may be described as a BBU located under CU #x. Further, when certain RU #z is connected to BBU #y and BBU #y is connected to CU #x, RU #z may be described as an RU located under BBU #y and as an RU located under CU #x, where x, y and z are non-negative integers. Also in this case, CU #x may be described as an upper apparatus of BBU #y and RU #z, and BBU #y may be described as an upper apparatus of RU #z. Note that #x, #y, and #z may correspond to identifiers for identifying CUs, BBUs, and RUs, respectively.

For example, in the example of CS of FIG. 1, the CU allocates frequency resource f1 for UE #1 and allocates frequency resource f2 for UE #2 in the scheduling for UE #1 and UE #2 located at the cell boundary. Such scheduling allows UE #1 to avoid the influence of interference due to the signal transmitted by RU #2, when receiving the signal from RU #1.

In the CB, beamforming is performed coordinately between the base stations. For example, in the CB, the signal transmission of an interfering beam is limited (stopped) for the UE located at the cell boundary. Here, stopping the signal transmission of the interfering beams may be referred to as "nulling."

For example, in the example of the CB in FIG. 1, the CU controls the CB in a network in which RU #1 is connected to BBU #1, RU #2 is connected to BBU #2, and BBU #1 and BBU #2 are connected to the CU. In addition, based on the control of the CU, RU #1 connected to BBU #1 and RU #2 connected to BBU #2 form beams and transmit signals to the UE.

For example, in the example of CB in FIG. 1, RU #1 and RU #2 perform the signal transmission using the same frequency resource f1. In the signal transmission to UE #1 located at the cell boundary, RU #2 does not perform the signal transmission ("nulling"). Such a beam control allows UE #1 to avoid the influence of interference due to the signal transmitted by RU #2, when receiving the signal from RU #1.

Note that the CS and CB may be collectively referred to as "CSCB." Note also that the beam control in the CB may also be understood as an example of scheduling in the CS. The CSCB may be applied, for example, when RU #1 and RU #2 corresponding respectively to cell #1 and cell #2 are located under the same CU.

In the JT, a plurality of base stations operate coordinately, and the plurality of base stations perform a signal transmission to one UE. The JT may be applied, for example, when RU #1 and RU #2 corresponding respectively to cell #1 and cell #2 are located under the same BBU.

For example, in the example of the JT in FIG. 1, the BBU connected to RU #1 and RU #2 obtains, from RU #1 and RU #2, channel state information (CSI) including a channel estimation value of a downlink channel to UE #1. The BBU outputs to RU #1 and RU #2 a signal subjected to a precoding process based on the CSI and the like. RU #1 and RU #2 coordinately perform the signal transmission to UE #1 using, for example, the same frequency resource f1.

In the DPS, a plurality of base stations operate coordinately, and one of the plurality of base stations which is in a good condition transmits a signal to a UE. The DPS may be applied, for example, when RU #1 and RU #2 corresponding respectively to cell #1 and cell #2 are located under the same CU.

For example, in the example of FIG. 1, the CU determines that RU #1 is preferable to RU #2 for signal transmission to UE #1. Under the control of the CU, RU #1 transmits the signal to UE #1 even though UE #1 exists in cell #2. In this case, RU #2 stops the signal transmission.

In the BS cooperation techniques described above, when a plurality of RUs corresponding to a plurality of cells are located under the same CU, the CSCB and DPS may be applied for UEs existing at the cell boundary between the plurality of cells.

In addition, in the BS cooperation techniques described above, when a plurality of RUs corresponding to a plurality of cells are located under the same BBU, the CSCB, DPS, and JT may be applied for a UE(s) existing at the cell boundary between the plurality of cells.

In the BS cooperation techniques described above, the amount of communication in communication lines between the CU and the BBUs (hereinafter, sometimes referred to as "backhaul lines") increases, and the amount of consumption of a communication band of the backhaul lines increases.

In the BS cooperation techniques described above, depending on situations of the UEs and/or the RUs, it may be difficult to obtain effects of the BS cooperation techniques such as reduction in interference, improvement in communication quality, and the like even when the BS cooperation techniques are applied. Hereinafter, the application of the BS cooperation techniques to a moving UE will be described by giving examples.

Figure 2:
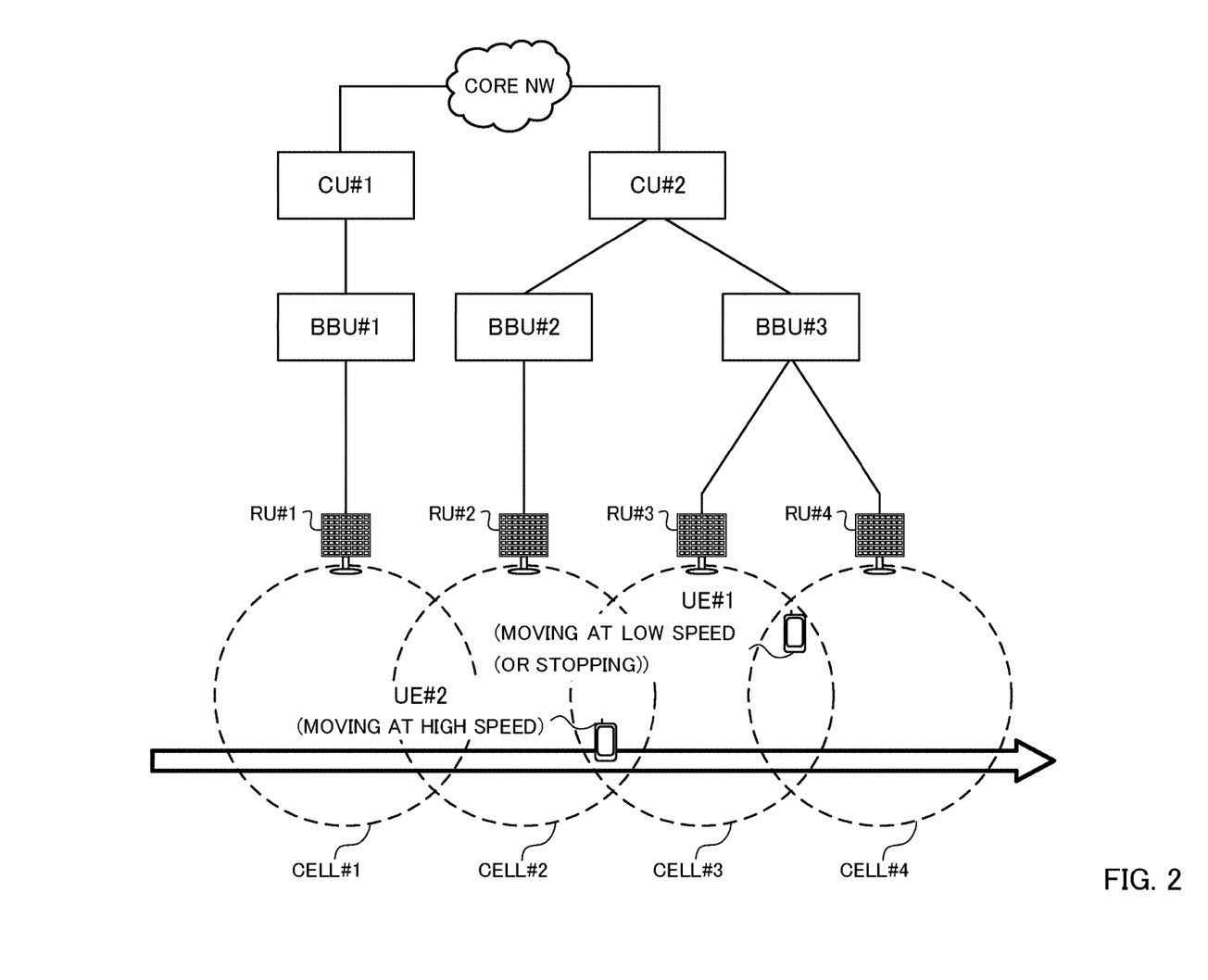
FIG. 2 illustrates an example of the BS cooperation technique for a UE moving between multiple cells.

FIG. 2 illustrates an example of the BS cooperation technique for a UE moving between a plurality of cells. FIG. 2 illustrates a network including CU #1; CU #2; BBU #1 connected to CU #1; BBU #2 and BBU #3 connected to CU #2; RU #1 connected to BBU #1; RU #2 connected to BBU #2; and RU #3 and RU #4 connected to BBU #3. In addition, RU #1 corresponds to cell #1, RU #2 corresponds to cell #2, RU #3 corresponds to cell #3, and RU #4 corresponds to cell #4.

In FIG. 2, UE #2 moves at a relatively higher speed than UE #1. In this case, the time when UE #2 is present at the boundary between two cells is shorter than the time UE #1 is present at the boundary. For example, in a case where the coordinated operation is performed for UE #2 between the signal transmission of RU #2 and the signal transmission of RU #3 during when UE #2 is present at the boundary between cell #2 and cell #3, it is difficult to reduce the interference and improve the communication quality because the time UE #2 is present at the cell boundary is short. Moreover, in this case, high speed movement causes a relative delay in the start of the coordinated operation, and may lead to failure of the coordinated operation.

On the other hand, in a case where the coordinated operation is performed for UE #1 between the signal transmission of RU #3 and the signal transmission of RU #4 during when UE #1 is present at the boundary between cell #3 and cell #4, it is easier for UE #1 to obtain the reduction in interference and the improvement in communication quality than for UE #2 since the time UE #1 is present at the cell boundary is relatively long.

Further, for example, depending on the amount of data to be transmitted to a UE(s), it may be preferable not to perform the coordinated operation. For example, when the amount of data transmitted to the UE is relatively small, the coordinated operation may not be performed, and when the amount of data transmitted to the UE is relatively large, the coordinated operation may be performed.

In addition, for example, whether or not to perform the coordinated operation may be changed depending on a condition for the signal transmission to a UE(s). For example, when low latency is desired in the signal transmission to the UE, the coordinated operation may be performed, and when low latency is not desired in the signal transmission to the UE, the coordinated operation may not be performed. Conversely, when low latency is desired in the signal transmission to the UE, the coordinated operation may not be performed, and when low latency is not desired in the signal transmission to the UE, the coordinated operation may be performed.

Further, whether or not to perform the coordinated operation may be changed, for example, depending on channel characteristics of channels between an RU(s) and a UE(s). For example, when the channel quality between the RU and the UE is relatively fine, the coordinated operation may be performed, and when the channel quality between the RU and the UE is not relatively fine, the coordinated operation may not be performed. Conversely, when the channel quality between the RU and the UE is relatively fine, the coordinated operation may not be performed, and when the channel quality between the RU and the UE is not relatively fine, the coordinated operation may be performed.

One aspect of the present disclosure will be described in relation to an appropriate control of the BS cooperation technique (coordinated operation).

One Embodiment

<Configuration of Radio Communication System>

Figure 3:
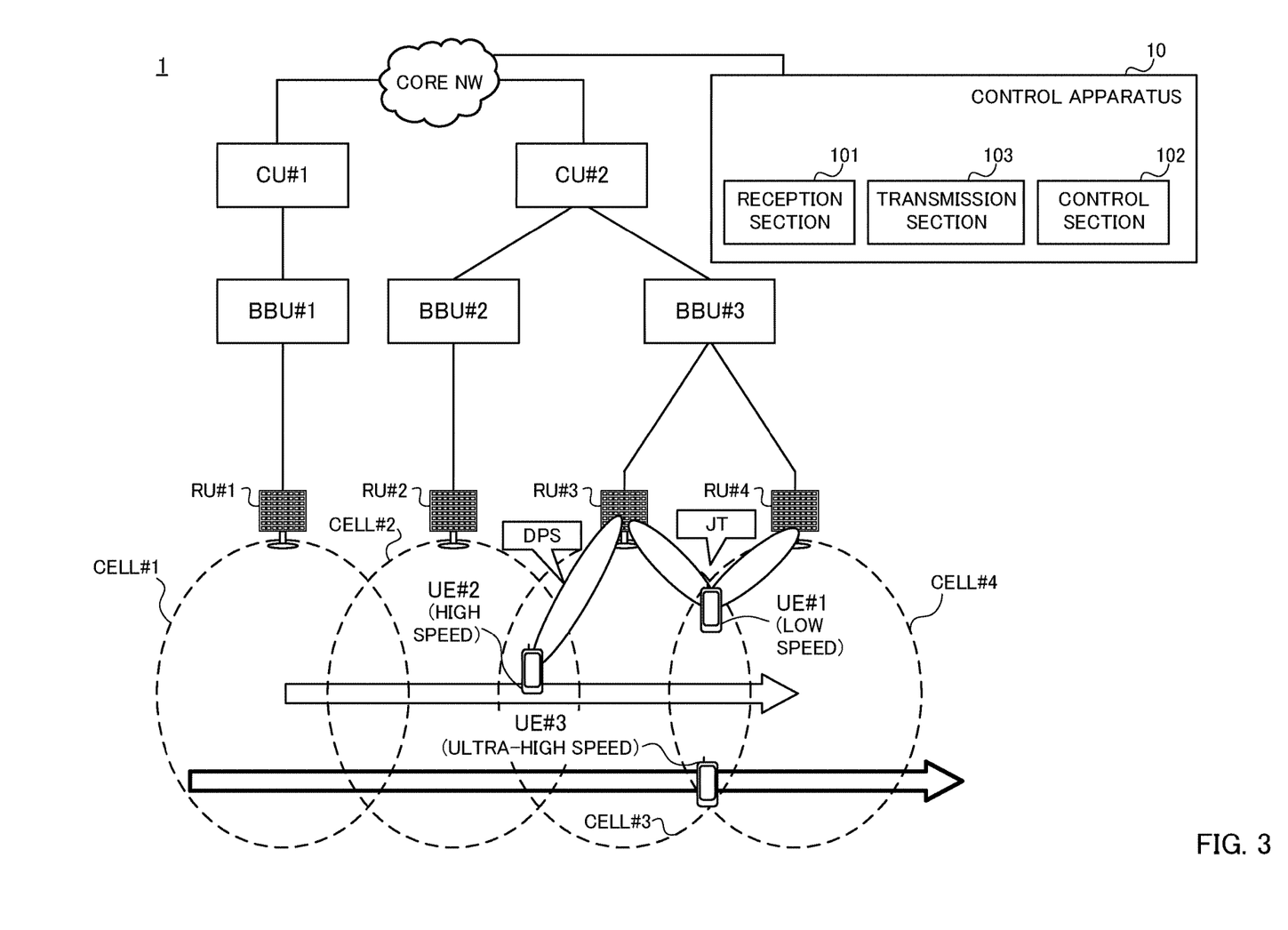
FIG. 3 illustrates an example of a configuration of a radio communication system according to an embodiment.

FIG. 3 illustrates an example of the configuration of radio communication system 1 according to the present embodiment. Radio communication system 1 illustrated in FIG. 3 includes control apparatus 10, CU #1, CU #2, BBU #1 connected to CU #1, and BBU #2 and BBU #3 connected to CU #2. Radio communication system 1 illustrated in FIG. 3 also includes RU #1 connected to BBU #1, RU #2 connected to BBU #2, and RU #3 and RU #4 connected to BBU #3. Note that the respective numbers of CUs, BBUs, and RUs and the connection relationship between them are only examples, and the present disclosure is not limited thereto.

RU #1 corresponds to cell #1, RU #2 corresponds to cell #2, RU #3 corresponds to cell #3, and RU #4 corresponds to cell #4.

Control apparatus 10 in FIG. 3 includes reception section 101, control section 102, and transmission section 103. Control apparatus 10, CU #1, and CU #2 are connected to each other via a core network (core NW). Control apparatus 10 is exemplarily capable of communicating with the CUs, BBUs, and RUs of radio communication system 1.

Reception section 101 receives information from apparatuses (e.g., CUs) in the system and outputs the information to control section 102. The information received by reception section 101 may include, for example, at least part of information on the locations of UEs, information on the moving speeds of the UEs, and information on the RUs connected to the UEs by radio.

Control section 102 determines, for each UE, a method for the coordinated operation for the signal transmission to the UE. For example, control section 102 determines whether or not the coordinated operation is performed for the signal transmission to each of the UEs present at the cell boundary. Further, control section 102 may determine the pattern of the coordinated operation when the coordinated operation is performed. Examples of the pattern of coordinated operation may include the CSCB, DPS, and JT. Control section 102 may determine whether or not handover (HO) is performed when the coordinated operation is not performed. For example, based on the information received by reception section 101, control section 102 may determine whether or not the coordinated operation is performed.

In addition, control section 102 may control dynamic switching of the functions of the apparatuses constituting the system. For example, based on the information received by reception section 101, control section 102 may determine to cause a BBU to perform at least a part of the functions of a CU.

Transmission section 103 outputs the control information determined by control section 102. For example, the destination of output of transmission section 103 may be at least one BBU or at least one CU.

Note that, in radio communication system 1 illustrated in FIG. 3, an example is illustrated in which control apparatus 10 is connected to the core network, but the present disclosure is not limited to this. Control apparatus 10 may be directly connected to any one of the CUs, BBUs, and RUs of radio communication system 1. Alternatively, the configuration of control apparatus 10 may be mounted in any one of the CUs, BBUs, and RUs of radio communication system 1.

Next, an example of determination by control apparatus 10 of whether or not to perform coordinated transmission will be described.

By way of example, in the present embodiment, control apparatus 10 determines, for each UE, whether or not to perform the coordinated operation. Further, in the present embodiment, when the coordinated operation is performed, the pattern of the coordinated operation may be determined.

In one example, whether or not to perform the coordinated operation is determined depending on the moving speed of a UE.

For example, when the moving speed of the UE is less than a first threshold, in other words, when the UE does not move or moves at a relatively low speed, control apparatus 10 determines to perform the coordinated operation for the UE. Hereinafter, a UE whose moving speed is less than the first threshold is referred to as a "low-speed UE."

Further, for example, when the moving speed of the UE is equal to or greater than the first threshold and less than a second threshold, in other words, when the UE moves at a relatively high speed, control apparatus 10 determines to perform the coordinated operation for the UE. Note that, the second threshold is greater than the first threshold. Hereinafter, a UE whose moving speed is equal to or greater than the first threshold and less than the second threshold is referred to as a "high-speed UE."

Further, for example, when the moving speed of the UE is equal to or greater than the second threshold, in other words, when the UE moves at a relatively ultra-high speed, control apparatus 10 determines to perform the coordinated operation for the UE. Hereinafter, a UE whose moving speed is equal to or greater than the second threshold is referred to as an "ultra-high-speed UE."

FIG. 3 illustrates three UEs with different moving speeds and an example of application of the coordinated operation for each UE.

In the example of FIG. 3, control apparatus 10 determines to perform the coordinated operation for UE #1 existing at the boundary between cell #3 and cell #4 and corresponding to the low-speed UE. In addition, control apparatus 10 determines that the JT among the patterns of the coordinated operation is to be applied for UE #1. Control apparatus 10 outputs information on the determined pattern of the coordinated operation to at least one of CU #2 and apparatuses located under CU #2.

In addition, control apparatus 10 determines to perform the coordinated operation for UE #2 existing at the boundary between cell #2 and cell #3 and corresponding to the high-speed UE. In addition, control apparatus 10 determines that the DPS among the patterns of the coordinated operation is to be applied for UE #2. Control apparatus 10 outputs information on the determined pattern of the coordinated operation to at least one of CU #2 and the apparatuses located under CU #2.

In addition, control apparatus 10 determines not to perform the coordinated operation for UE #3 existing at the boundary between cell #3 and cell #4 and corresponding to the ultra-high-speed UE. Control apparatus 10 outputs, to at least one of CU #2 and the apparatuses located under CU #2, control information including an instruction for not performing the coordinated operation.

Through such control, the effects of the coordinated operation such as reduction in interference and improvement in communication quality can be obtained, for example, for the low-speed UE and high-speed UE by performing the coordinated operation. On the other hand, for the ultra-high-speed UE, it is possible to reduce the amount of communication of the backhaul lines by not performing the coordinated operation, so as to reduce the amount of consumption of the communication band of the backhaul lines.

For example, the thresholds for the moving speed may be changed depending on the number of UEs connected. For example, when the number of connected UEs is large so that the traffic increases, the thresholds may be changed in order to reduce the number of UEs for which the coordinated operation is performed.

Note that the example has been described above in which the UEs are distinguished by the moving speeds between three categories of the low-speed UE, the high-speed UE, and the ultra-high-speed UE, but the present disclosure is not limited thereto. For example, the UEs may be distinguished by the moving speeds between two, four, or more categories. In addition, the correspondence between the moving speeds and the patterns of the coordinated operation is not limited to the example described above. For example, the DPS or CSCB may be applied for the low-speed UE, and the CSCB or JT may be applied for the high-speed UE.

Further, the example has been described above in which whether or not to perform the coordinated operation and the pattern of the coordinated operation are determined for each UE depending on the moving speed, but whether or not to perform the coordinated operation and the pattern of the coordinated operation may be determined for each UE depending on information different from the moving speed. Examples of the information different from the moving speed may include at least one of the amount of data to be transmitted to a UE, the condition for signal transmission to the UE, and the channel characteristics of a channel between an RU and the UE. In addition, whether or not to perform the coordinated operation and the pattern of the coordinated operation may be determined for each UE based on a combination of the moving speed and the information different from the moving speed. For example, whether or not to perform the coordinated operation may be determined for each UE based on the moving speed, and the pattern of the coordinated operation may be determined for each UE based on the information different from the moving speed.

The example has been described above in which whether or not to perform the coordinated operation is determined for each UE, but the functions of radio communication system 1 may be dynamically switched according to a result of the determination for each UE.

Figure 4:
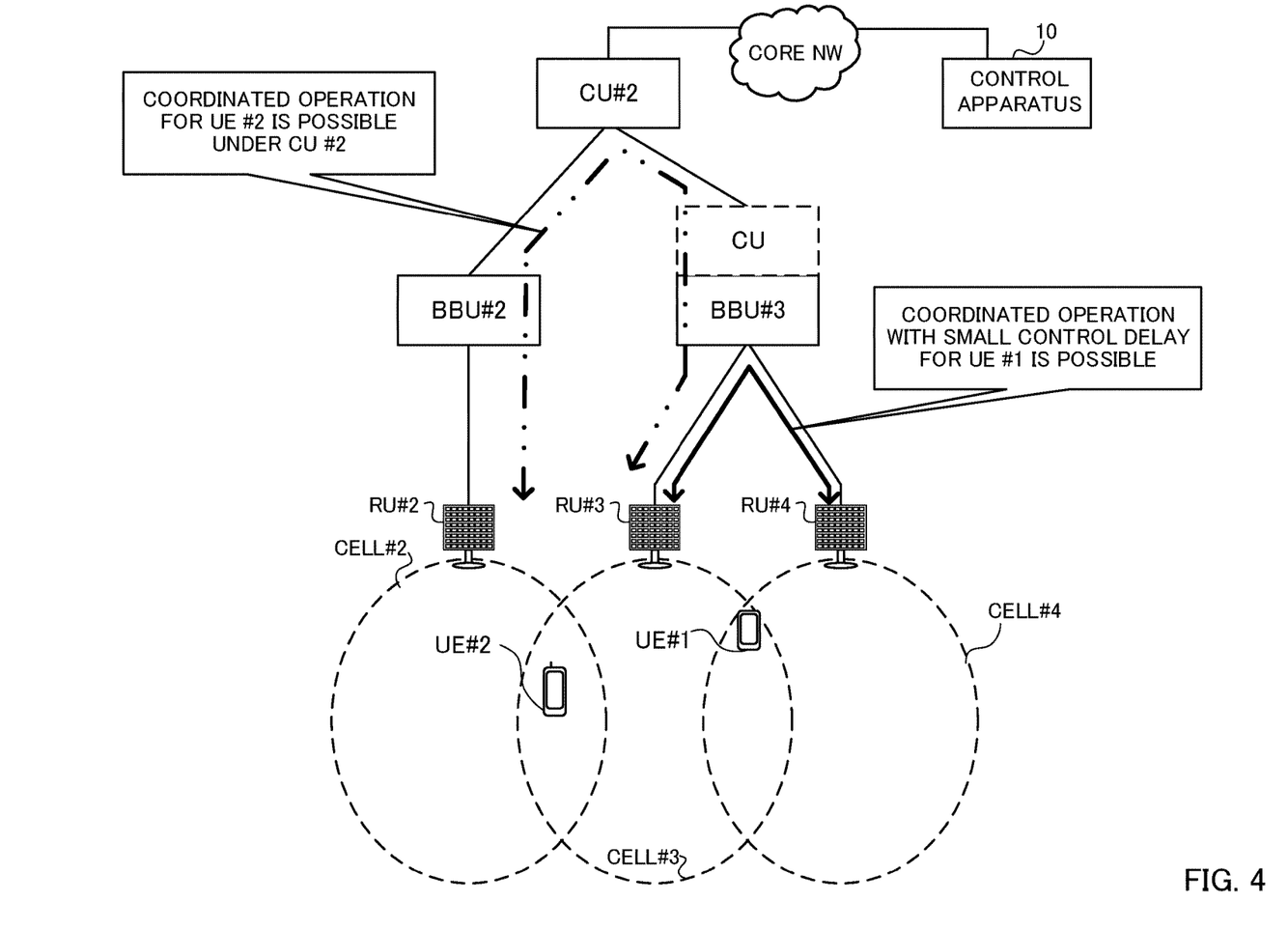
FIG. 4 illustrates a first example of a functional variation in the radio communication system.

FIG. 4 illustrates a first example of a functional variation in radio communication system 1. FIG. 4 illustrates RU #2, RU #3, RU #4, BBU #2, BBU #3, and CU #2 among the elements in radio communication system 1 illustrated in FIG. 3.

In FIG. 4, at least a part of the functions of the CU is included in BBU #3. In addition, whether or not the function of the CU in BBU #3 operates may be determined for each UE.

For example, whether or not to operate the function of the CU in BBU #3 may be determined depending on the moving speed of a UE.

For example, in the example of FIG. 4, when UE #1 existing at the cell boundary between cell #3 and cell #4 is the low-speed UE or the high-speed UE, the function of the CU in BBU #3 may operate. Here, by the function of the CU in BBU #3 operating, the coordinated operation is performed for UE #1 between RU #3 and RU #4. Since the function of the CU in BBU #3 operates in this coordinated operation, the communication from BBU #3 to CU #2 can be omitted, and the amount of communication between BBU #3 and CU #2 can be reduced. In addition, since the time for transmitting and receiving information on the coordinated operation between BBU #3 and CU #2 is reduced, it is possible to reduce a control delay of the coordinated operation, to perform the coordinated operation simply.

Further, for example, in the example of FIG. 4, when UE #1 is the ultra-high-speed UE, the function of the CU in BBU #3 may not operate. Note that, in this case, the coordinated operation may not be performed for UE #1 being the ultra-high-speed UE.

For example, based on the moving speed of UE #1, control apparatus 10 determines whether or not to perform the coordinated operation for UE #1. When control apparatus 10 determines to perform the coordinated operation for UE #1, control apparatus 10 outputs to BBU #3 an instruction for operating the function of the CU in BBU #3 (i.e., for turning on the function of the CU).

In addition, in the example of FIG. 4, when UE #2 existing at the cell boundary between cell #2 and cell #3 is the low-speed UE or the high-speed UE, the CU in BBU #3 may not operate. Note that, in this case, the coordinated operation for UE #2 is performed between RU #2 and RU #3 under the control of CU #2.

Further, when UE #2 is the ultra-high-speed UE, the function of the CU in BBU #3 may not operate. Note that, in this case, the coordinated operation may not be performed for UE #2.

As illustrated in FIG. 4, as compared with the case where a certain BBU always performs each of the functions of the CU, an application area located under the CU can be expanded by dynamically switching the apparatus performing each function.

Figure 5:
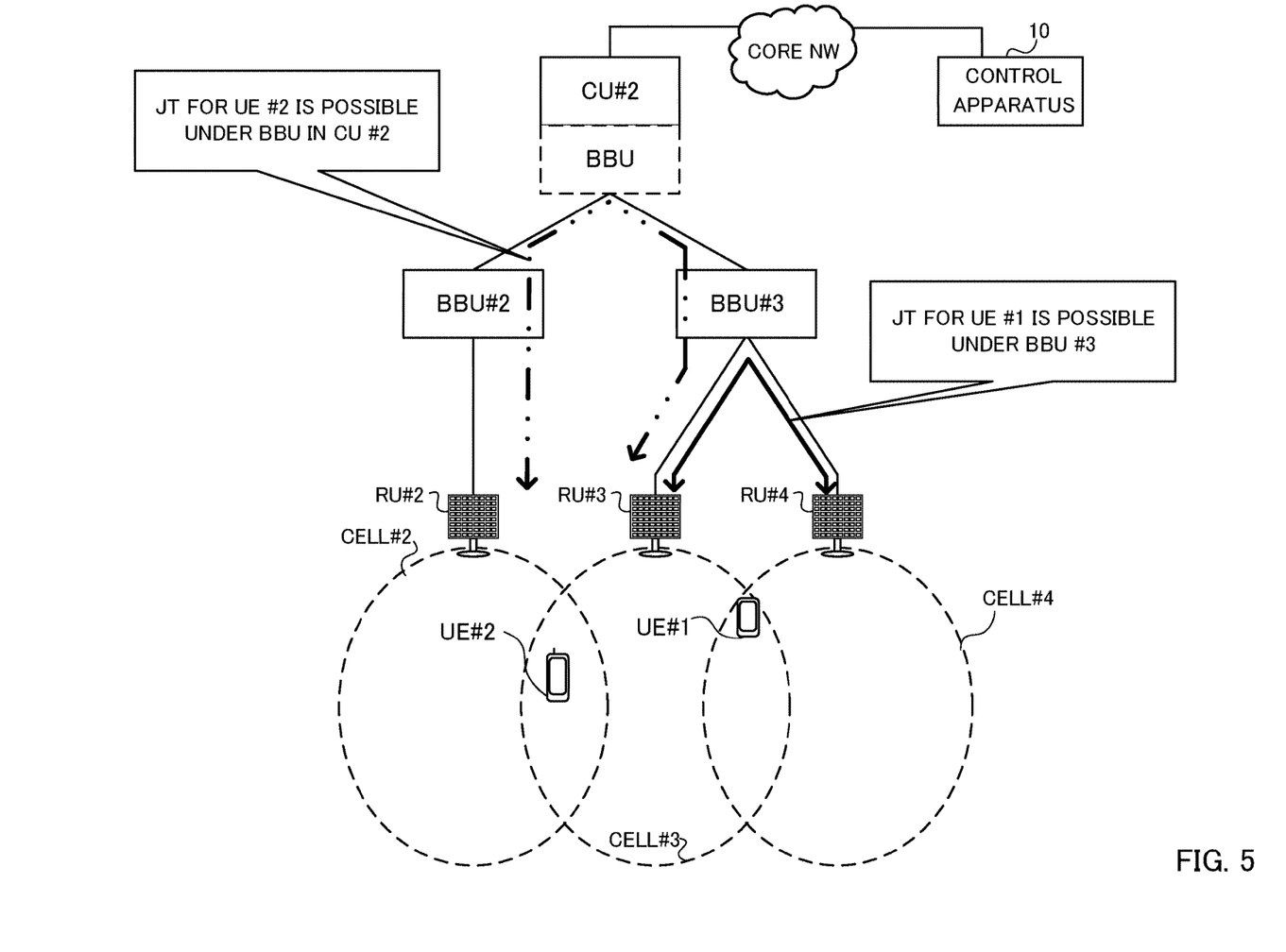
FIG. 5 illustrates a second example of the functional variation in the radio communication system.

FIG. 5 illustrates a second example of the functional variation in radio communication system 1. FIG. 5 illustrates RU #2, RU #3, RU #4, BBU #2, BBU #3, and CU #2 among the elements in radio communication system 1 illustrated in FIG. 3.

In FIG. 5, at least a part of the functions of the BBU is included in CU #2. In addition, whether or not the function of the BBU in CU #2 operates may be determined for each UE.

For example, whether or not to operate the function of the BBU in CU #2 may be determined depending on the moving speed of a UE.

For example, in the example of FIG. 5, when UE #2 existing at the cell boundary between cell #2 and cell #3 is the low-speed UE or the high-speed UE, the BBU in CU #2 may operate. In this case, since the function of the BBU in CU #2 operates to allow RU #2 and RU #3 to be located under the same BBU, the JT may be applied for UE #2 between RU #2 and RU #3.

Further, when UE #2 is the ultra-high-speed UE, the function of the BBU in CU #2 may not operate. Note that, in this case, the coordinated operation may not be performed for UE #2.

For example, based on the moving speed of UE #2, control apparatus 10 determines whether or not to perform the coordinated operation for UE #2. When control apparatus 10 determines to perform the coordinated operation for UE #2, control apparatus 10 outputs to CU #2 an instruction for operating the function of the BBU in CU #2 (i.e., for turning on the function of the BBU). Note that, when control apparatus 10 determines not to apply the JT for UE #2, control apparatus 10 may not output to CU #2 the instruction for operating the function of the BBU in CU #2 (for turning on the function of the BBU).

Further, in the example of FIG. 5, when UE #1 existing at the cell boundary between cell #3 and cell #4 is the low-speed UE or the high-speed UE, the function of the BBU in CU #2 may not operate. Note that, in this case, the coordinated operation for UE #1 is performed between RU #3 and RU #4 under the control of CU #2. Additionally, in this case, the JT may be applied for UE #1 between RU #3 and RU #4.

Further, when UE #1 is the ultra-high-speed UE, the function of the BBU in CU #2 may not operate. Note that, in this case, the coordinated operation may not be performed for UE #1.

As illustrated in FIG. 5, since the configuration is not such that a certain BBU is physically moved to the CU (not such that the BBU is built in the CU apparatus), it is possible to expand the application area located under the CU to apply enhanced cooperation (enhanced coordinated operation (e.g., JT)) by dynamically switching the apparatus performing each function. This configuration can achieve effective cooperation, for example, when there is enough room in the backhaul lines in terms of traffic amount.

Note that, in the examples described above, a method for determining the moving speeds of the UEs is not limited. For example, information on the moving speeds may be obtained from the UEs. Alternatively, the moving speeds of the UEs may be estimated based on the transition of location information such as image data, position measurement data, and/or the like.

Further, the above-described examples have been described by taking the example of the relationship between the moving speed and the coordinated operation at a present time point, but the present disclosure is not limited to this. For example, the moving speed at and after a next time point next to the present time point may be estimated from the moving speed at the present time point. The time between the next time point and the present time point may be specified, for example, by the specifications and/or capabilities of the system.

By predicting a mobile environment and/or a communication environment of the UEs in advance, the coordinated operation and/or HO operation at and after the next time point can be dynamically controlled.

Figure 6:
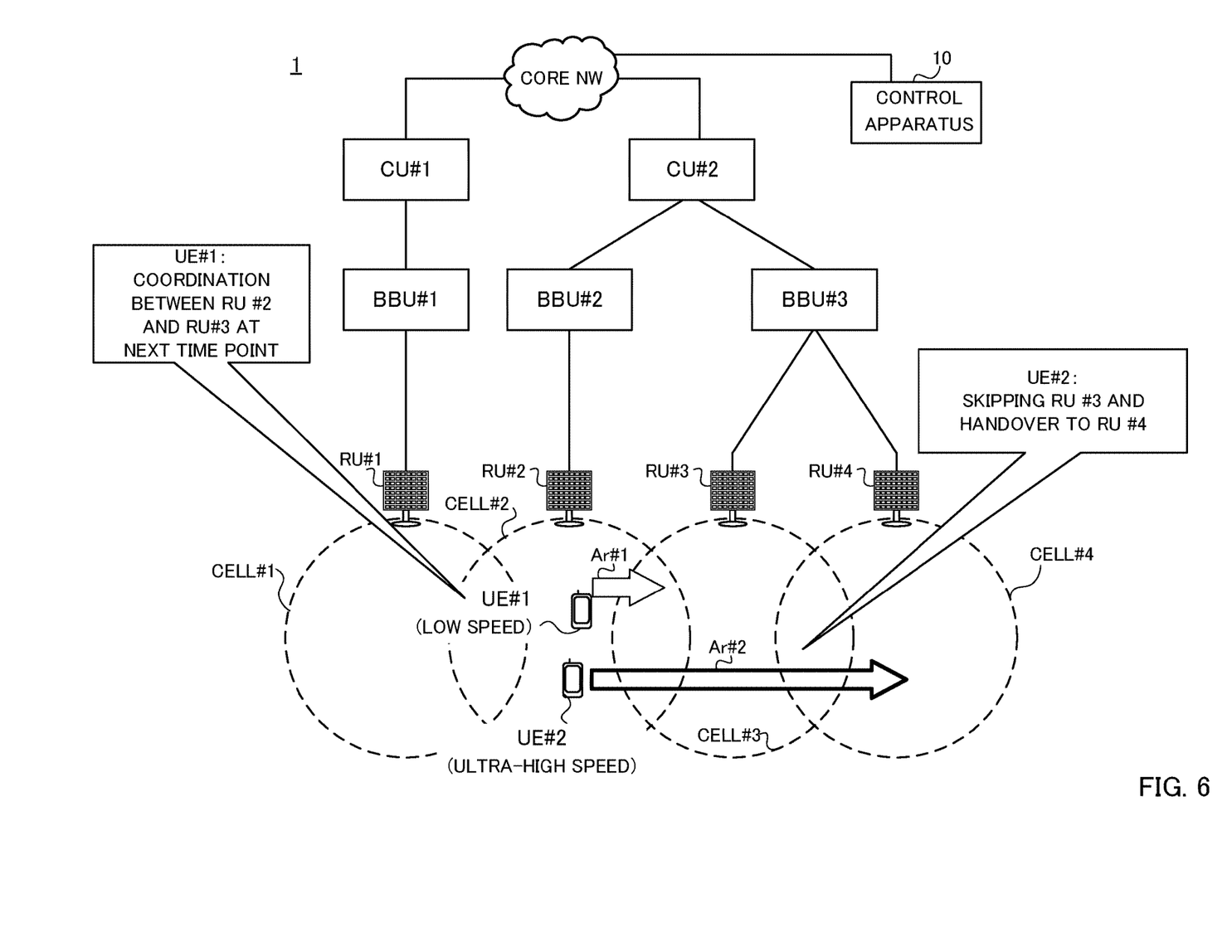
FIG. 6 illustrates an example of control based on prediction of a moving speed.

FIG. 6 illustrates an example of control based on prediction of the moving speeds. FIG. 6 illustrates radio communication system 1 similar to that in FIG. 3.

Further, in FIG. 6, UE #1 is the low-speed UE, and UE #2 is the ultra-high-speed UE. In addition, Ar #1 in FIG. 6 represents a moving path of movement of UE #1 by the next time point, and Ar #2 represents a moving path of movement of UE #2 by the next time point. Note that, the moving paths illustrated in FIG. 6 exemplarily represent moving paths of movement taking place from the present time point to the next time point that is a time point after the elapse of a unit time from the present time point.

For example, the moving paths may be predicted by control apparatus 10. Then, control apparatus 10 determines, for each UE, an operation for the UE at the next time point based on the predicted moving path.

In the example of FIG. 6, UE #1 is predicted to move to the cell boundary between cell #2 and cell #3 by the next time point. In this case, for example, control apparatus 10 determines that the coordinated operation is performed for UE #1 between RU #2 and RU #3 at the next time point. Then, control apparatus 10 gives an instruction to CU #2, and the coordinated operation between RU #2 and RU #3 is performed under the control of CU #2.

Further, in the example of FIG. 6, UE #2 existing in cell #2 and connected to RU #2 at the present time point passes cell #3 and moves to cell #4 by the next time point. In this case, with respect to the HO of UE #2 to a connection target, control apparatus 10 determines that the HO from RU #2 to RU #3 is not performed and the HO from RU #2 to RU #4 is performed. In other words, in switching of the HO target of UE #2, control apparatus 10 determines that RU #3 is to be skipped.

As described above, control apparatus 10 predicts the moving paths, and dynamically controls the coordinated operation and/or the HO at the next time point based on the prediction result. It is thus possible to achieve an appropriate control of BS cooperation.

(Hardware Configuration)

Note that, the block diagrams used to describe the above embodiment illustrate blocks on a function-by-function basis. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or by radio), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmitting unit," "transmission section," or "transmitter." The methods for implementing the functions are not limited specifically as described above.

Figure 7:
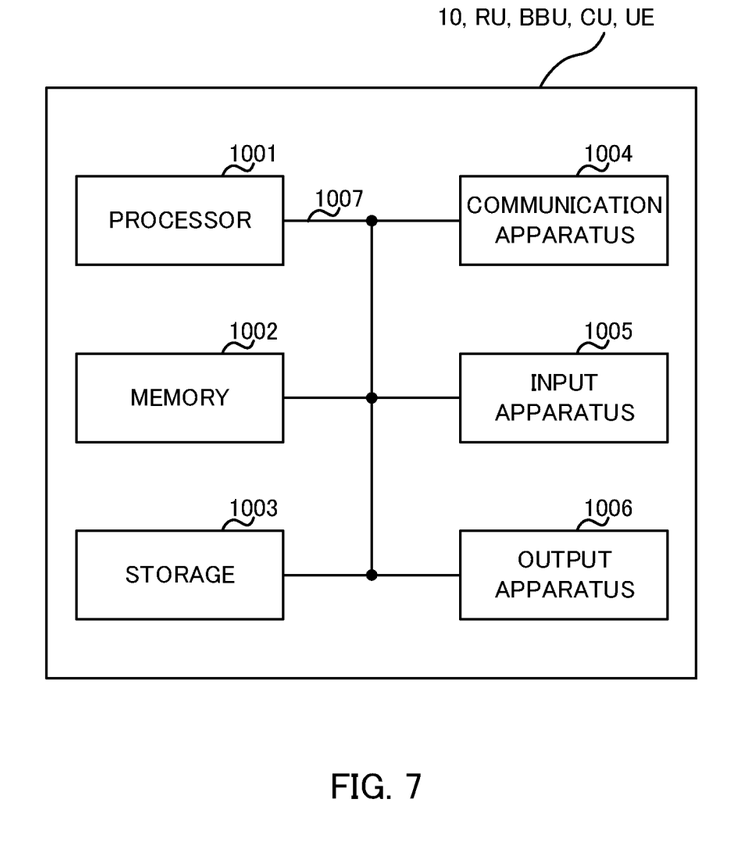
FIG. 7 illustrates an exemplary hardware configuration of an apparatus according to one embodiment of the present disclosure.

For example, control apparatus 10, the CUs, the BBUs, the RUs, the UEs, and the like according to one embodiment of the present disclosure may function as a computer that executes processing of a radio communication method of the present disclosure. FIG. 7 illustrates an exemplary hardware configuration of an apparatus according to one embodiment of the present disclosure. Control apparatus 10, the CUs, the BBUs, the RUs, and the UEs described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of control apparatus 10 may include one apparatus or a plurality of apparatuses illustrated in FIG. 3 or may not include part of the apparatuses.

The functions of control apparatus 10, the CUs, the BBUs, the RUs, and the UEs are implemented by predetermined software (program) loaded into hardware, such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control section 102 and/or the like as described above may be implemented by processor 1001.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiments is used. For example, control section 102 of control apparatus 10 may be implemented by a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented using one or more chips. Note that the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called as a register, a cache, a main memory (main storage apparatus), or the like. Memory 1002 can save a program (program code), a software module, and the like that can be executed to carry out the radio communication method according to an embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called as an auxiliary storage apparatus. The storage medium as described above may be, for example, a database, a server, or other appropriate media including at least one of memory 1002 and storage 1003.

Communication apparatus 1004 is hardware (transmission and reception device) for communication between computers through at least one of wired and radio networks and is also called as, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, reception section 101, transmission section 103, and the like as described above may be implemented using communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which makes outputs to the outside. Note that input apparatus 1005 and output apparatus 1006 may be integrated (for example, a touch panel).

The apparatuses, such as processor 1001, memory 1002, and the like are connected by bus 1007 for communication of information. Bus 1007 may be configured using a single bus or using buses different between each pair of the apparatuses.

Furthermore, control apparatus 10, the CUs, the BBUs, the RUs, and the UEs may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented using at least one of these pieces of hardware.

(Notification of Information and Signaling)

The notification of information is not limited to the aspects or embodiments described in the present disclosure, and the information may be notified by another method. For example, the notification of information may be carried out by one or a combination of physical layer signaling (for example, Downlink Control Information (DCI) and Uplink Control Information (UCI)), upper layer signaling (for example, Radio Resource Control (RRC) signaling, Medium Access Control (MAC) signaling, notification information (Master Information Block (MIB), and System Information Block (SIB))), and other signals. The RRC signaling may be called an RRC message and may be, for example, an RRC connection setup message, an RRC connection reconfiguration message, or the like.

(Applied System)

The aspects and embodiments described in the present disclosure may be applied to at least one of a system using Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended based on the above systems. Additionally or alternatively, a combination of two or more of the systems (e.g., a combination of at least LTE or LTE-A and 5G) may be applied.

(Processing Procedure and the Like)

The orders of the processing procedures, the sequences, the flow charts, and the like of the aspects and embodiments described in the present disclosure may be changed as long as there is no contradiction. For example, elements of various steps are presented in exemplary orders in the methods described in the present disclosure, and the methods are not limited to the presented specific orders.

(Operation of Base Station)

Specific operations which are described in the present disclosure as being performed by the base station may sometimes be performed by an upper node depending on the situation. Various operations performed for communication with a terminal in a network constituted by one network node or a plurality of network nodes including a base station can be obviously performed by at least one of the base station and a network node other than the base station (examples include, but not limited to, Mobility Management Entity (MME) or Serving Gateway (S-GW)). Although there is one network node in addition to the base station in the case illustrated above, a plurality of other network nodes may be combined (for example, MME and S-GW).

(Direction of Input and Output)

The information or the like (see the item of "Information and Signals") can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed using a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a web site, a server, or another remote source by using at least one of a wired technique (e.g., a coaxial cable, an optical fiber cable, a twisted pair, and a digital subscriber line (DSL)) and a radio technique (e.g., an infrared ray and a microwave), the at least one of the wired technique and the radio technique is included in the definition of the transmission medium.

(Information and Signals)

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

("System" and "Network")

The terms "system" and "network" used in the present disclosure can be interchangeably used.

(Names of Parameters and Channels)

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (for example, PUCCH and PDCCH) and information elements, can be identified by any suitable names, and various names assigned to these various channels and information elements are not limitative in any respect.

(Base Station (Radio Base Station))

The terms "Base Station (BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like may be used interchangeably in the present disclosure. The base station may be called a macro cell, a small cell, a femtocell, or a pico cell.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor remote radio head (RRH)). The term "cell" or "sector" denotes part or all of the coverage area of at least one of the base station and the base station subsystem that perform the communication service in the coverage.

(Terminal)

The terms "Mobile Station (MS)," "user terminal," "User Equipment (UE)," and "terminal" may be used interchangeably in the present disclosure.

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

(Base Station/Mobile Station)

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be Internet-of-Things (IoT) equipment such as a sensor.

The base station in the present disclosure may also be replaced with the user terminal. For example, the aspects and the embodiments of the present disclosure may find application in a configuration that results from replacing communication between the base station and the user terminal with communication between multiple user terminals (such communication may, e.g., be referred to as device-to-device (D2D), vehicle-to-everything (V2X), or the like). In this case, the terminal may be configured to have the functions that the base station described above has. The wordings "uplink" and "downlink" may be replaced with a corresponding wording for inter-equipment communication (for example, "side"). For example, an uplink channel, a downlink channel, and the like may be replaced with a side channel.

Similarly, the terminal in the present disclosure may be replaced with the base station. In this case, the base station is configured to have the functions that the terminal described above has.

(Meaning and Interpretation of Terms)

As used herein, the term "determining" may encompass a wide variety of actions. For example, "determining" may be regarded as judging, calculating, computing, processing, deriving, investigating, looking up, searching (or, search or inquiry)(e.g., looking up in a table, a database or another data structure), ascertaining and the like. Furthermore, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming," "expecting," "considering," and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

The reference signal can also be abbreviated as an RS and may also be called as a pilot depending on the applied standard.

The description "based on" used in the present disclosure does not mean "based only on," unless otherwise specified. In other words, the description "based on" means both of "based only on" and "based at least on."

Any reference to elements by using the terms "first," "second," and the like does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

The "section" in the configuration of each apparatus may be replaced with "means," "circuit," "device," or the like.

In a case where terms "include," "including," and their modifications are used in the present disclosure, these terms are intended to be inclusive like the term "comprising."

Further, the term "or" used in the present disclosure is not intended to be an exclusive or.

The radio frame may be constituted by one frame or a plurality of frames in the time domain. The one frame or each of the plurality of frames may be called a subframe in the time domain. The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology, for example, indicates at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM)) symbol, Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini slot, and the symbol indicate time units in transmitting signals. The radio frame, the subframe, the slot, the mini slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms. Note that, a unit that represents the TTI may be referred to as a slot, a mini-slot, or the like instead of a subframe.

Here, the TTI, for example, refers to a minimum time unit for scheduling in radio communication. For example, in an LTE system, the base station performs scheduling for allocating a radio resource (a frequency bandwidth, a transmit power, and the like that are used in each user terminal) on a TTI-by-TTI basis to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (for example, the number of symbols) to which the transport block, the code block, the codeword, or the like is actually mapped may be shorter than the TTI.

Note that, in a case where one slot or one mini-slot is referred to as the TTI, one or more TTIs (that is, one or more slots, or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that the long TTI (for example, the usual TTI, the subframe, or the like) may be replaced with the TTI that has a time length which exceeds 1 ms, and the short TTI (for example, the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one symbol or a plurality of symbols in the time domain, and may have a length of one slot, one mini slot, one subframe, or one TTI. One TTI and one subframe may be constituted by one resource block or a plurality of resource blocks.

Note that one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common resource blocks (RB) for certain numerology in a certain carrier. Here, the common RBs may be identified by RB indices that use a common reference point of the carrier as a reference. The PRB may be defined by a certain BWP and may be numbered within the BWP.

The BWP may include a UL BWP and a DL BWP. An UE may be configured with one or more BWPs within one carrier.

At least one of the configured BWPs may be active, and the UE does not have to assume transmission/reception of a predetermined signal or channel outside the active BWP. Note that, "cell," "carrier," and the like in the present disclosure may be replaced with "BWP."

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

In a case where articles, such as "a," "an," and "the" in English, for example, are added in the present disclosure by translation, nouns following these articles may have the same meaning as used in the plural.

In the present disclosure, the expression "A and B are different" may mean that "A and B are different from each other." Note that, the expression may also mean that "A and B are different from C." The expressions "separated" and "coupled" may also be interpreted in the same manner as the expression "A and B are different."

Variations and the Like of Aspects

The aspects and embodiments described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present disclosure. Modifications and variations of the aspects of the present disclosure can be made without departing from the spirit and the scope of the present disclosure defined by the description of the appended claims. Therefore, the description of the present disclosure is intended for exemplary description and does not limit the present disclosure in any sense.

The present patent application claims the benefit of priority based on Japanese Patent Application No. 2020-058853 filed on Mar. 27, 2020, and the entire content of Japanese Patent Application No. 2020-058853 is hereby incorporated by reference.

INDUSTRIAL APPLICABILITY

One aspect of the present disclosure is useful, for example, for radio communication systems.

REFERENCE SIGNS LIST

10 Control apparatus
101 Reception section
102 Control section
103 Transmission section

The invention claimed is:

1. A radio communication system, comprising:
a radio apparatus that transmits a signal to a terminal;
a first radio communication control apparatus that is connected to the radio apparatus and performs baseband processing of the signal;
a second radio communication control apparatus that is connected to the first radio communication control apparatus and controls the first radio communication control apparatus; and
a control apparatus that determines a method for a coordinated operation performed between a plurality of radio apparatuses for signal transmission to the terminal and outputs control information on the method determined to the first radio communication control apparatus,
wherein the first radio communication control apparatus has at least a part of a function of the second radio communication control apparatus, and
wherein the control apparatus performs a control for the signal transmission to the terminal such that the at least the part of the function is on or off.

2. A radio communication system, comprising:
a radio apparatus that transmits a signal to a terminal;
a first radio communication control apparatus that is connected to the radio apparatus and performs baseband processing of the signal;
a second radio communication control apparatus that is connected to the first radio communication control apparatus and controls the first radio communication control apparatus; and
a control apparatus that determines a method for a coordinated operation performed between a plurality of radio apparatuses for signal transmission to the terminal and outputs control information on the method determined to the second radio communication control apparatus,
wherein the second radio communication control apparatus has at least a part of a function of the first radio communication control apparatus, and
wherein the control apparatus performs a control for the signal transmission to the terminal such that the at least the part of the function is on or off.

* * * * *